United States Patent Office 3,517,092
Patented June 23, 1970

3,517,092
PROCESS FOR PREPARING HIGH-DENSITY
ISOTROPIC GRAPHITE STRUCTURES
George R. Peterson, Andersonville, Tenn., assignor to the United States of America as represented by the United States Atomic Energy Commission
No Drawing. Filed Apr. 15, 1968, Ser. No. 721,144
Int. Cl. C01b 31/04
U.S. Cl. 264—29                                9 Claims

ABSTRACT OF THE DISCLOSURE

A high density, isotropic graphite structure comprising essentially 100 percent graphite is prepared by wet-blending graphite flour having an average particle size no greater than —5 micron with pitch, forming an isotropic graphite structure which has a density within the range of 1.70–1.95 gms./cc. from this admixture, heating the graphite structure in a confining graphite die to an elevated temperature to carbonize the pitch and remove essentially all volatile materials while maintaining the density at a value within the range of 1.70–1.95 gms./cc., conducting a series of repetitive steps of impregnating the graphite structure with pitch by isostatic pressing at a pressure of at least 4500 p.s.i. at 200° C., heating the impregnated structure while submerged in pitch to an elevated temperature to carbonize the pitch and remove essentially all volatile materials, thereby raising the density of the graphite structure to at least 1.95 gms./cc. and thereafter heating the structure to 3000° C., to fully graphitize the structure.

BACKGROUND OF THE INVENTION

The invention described herewith was made in the course of, or under, a contract with the U.S. Atomic Energy Commission. It relates generally to methods for preparing graphite and more particularly to a method for preparing nuclear grade isotropic graphite which has a high density, low permeability, and is 100 percent graphite, and to the product produced thereby.

Owing to its excellent thermal stability, thermal conductivity and acceptable nuclear properties, graphite has found widespread general utility as a reactor material, being used chiefly as a moderator or reflector. It has, however, a relatively low impact strength and is quite porous and is therefore unsuitable for certain reactor applications.

One nuclear application of interest, in which graphite having special properties would be most useful, is as a construction material for a molten salt type reactor. To be useful as a construction material in a molten salt reactor the graphite must be fully graphite to resist dimensional changes due to irradiation and must have a high density (>1.88 gms./cc.) and low permeability to prevent infiltration and attack by the molten salt. Also, the graphite must be of high strength to provide structural strength and be isotropic, i.e., having the same coefficient of expansion along any axis, to provide uniform thermal expansion at reactor operating temperatures. As far as is known none of the commercially available graphites meet these criteria. By this it is not meant to imply that these various graphite products are completely unsatisfactory for such use. Rather, it has been found that where a particular graphite was of high density, e.g., 1.90 gms./cc., it was either not fully graphite, containing for example glassy carbon or other carbonaceous residue, or was anisotropic. Other graphites which were isotropic did not have the requisite low permeability to be compatible with a molten salt environment. Thus, it is highly desirable to provide a nuclear grade graphite which meets these criteria.

SUMMARY OF THE INVENTION

With this object in mind a high density, isotropic graphite structure was prepared by:

(1) wet blending an admixture of graphite flour having an average particle size no greater than —5 micron and pitch;

(2) forming an isotropic graphite structure from the admixture, said structure having a density selected from a value within the range of 1.70–1.95 gms./cc.;

(3) heating the isotropic graphite structure in a confining graphite die to an elevated temperature to carbonize said pitch and remove essentially all volatile materials while maintaining said density at said value;

(4) impregnating the resulting graphite structure with pitch by isostatic pressing at a pressure of at least 4500 p.s.i. and a temperature of about 200° C.;

(5) heating the impregnated structure while submerged in pitch to an elevated temperature to carbonize said pitch and remove essentially all volatile materials;

(6) repeating steps 4 and 5 until the resulting isotropic graphite structure has a density of at least 1.95 gms./cc.; and (7) heating the isotropic graphite structure to a temperature of about 3000° C. to fully graphitize the structure.

Graphite structures prepared in accordance with this method were found to be isotropic and essentially 100 percent graphite. Densities of >1.95 gms./cc. were obtainable with only 3 impregnations with the resulting structure having a tensile strength of 2300 p.s.i., compressive strength of 11,500 p.s.i., permeability of $<2 \times 10^{-4}$ cm.$^2$/sec. (average pore size 0.03 to 0.04 micron; maximum pore size 0.2 micron) and having an isotropic ratio of 1.02.

DESCRIPTION OF THE INVENTION

Formation of the admixture

One method of the invention may be carried out by employing an admixture of graphite flour having an average particle size no greater than —5 micron and a quantity of coal tar pitch which is wet-blended. Applicant has found that the addition of an organic wetting agent, such as benzene, promotes a better distribution of the pitch, which may be filtered, around the graphite particles, and it is preferred that an excess of benzene be added to the admixture during the blending step. Unlike previous industrial graphite processes which employ a shear blending of a dry mixture, this wet-blending step affords a more uniform dispersion of the pitch around the graphite particles and eliminates the formation of high density pitch pockets in the final product. Accordingly, this step is critical to the successful practice of this invention. While the graphite flour can vary up to —5 micron in average particle size, it may be provided as a mixture of graphite flour in which a large particle size (—5 micron) is employed with a smaller particle size, such as for example 0.03 micron average particle size. Mixtures of such graphite flours result in a smaller average pore size and lower permeability and are therefore preferred. A suitable formulation in a preferred admixture is 85 parts by weight —5 micron particle size graphite flour, 15 parts graphite flour having an average particle size of 0.03 micron, and 25 p.p.h. pitch. To this admixture about one gallon of benzene is added.

Any nuclear grade graphite powder, which has been fired to at least 2800° C., preferably to 3000° C., and has a boron content less than 1 p.p.m., iron content of less than 50 p.p.m., with other impurities being trace concentrations may be employed for the respective powder sizes. For the —5 micron particle size, Great Lakes 1008 Nuclear Grade reground and screened to —5 micron, commercially available from the Great Lakes Carbon Company, is quite suitable and Acheson-Colloid D–154–DAC ultrafine, commercially available from the Acheson Colloid Company, meets these criteria for the 0.03 micron particle size where a mixture of graphite flours is used. Any thermoplastic organic binder having a melting point of about 140° C. is suitable as the coal tar pitch. Allied Chemical CP–227–15V, commercially available from the Allied Chemical Company, is suitable as the pitch constituent, inasmuch as it has been found to readily graphitize when heated to a temperature of about 3000° C.

Formation of an isotropic graphite structure

After the admixture is blended until dry an isotropic graphite structure is formed. Initially the dried admixture is screened to insure breakup of any spherical graphite particles which are formed during the blending step. A 200-mesh screen (74µ) is suitable. It will be noted here that the larger the size of the graphite particles the lower the green bulk density after pressing.

The minus 200-mesh material is then placed in an extrusion press (3.75" ID x 8") which is blanked off at one end with an end cap to provide for die pressing the material into a billet. A vacuum is pulled on the cavity to remove air and the ram moved past the vent port. The assembly is then heated to 175° C. by external heating coils to melt the pitch and facilitate compaction. Here the temperature to which the material is heated should be selected so as to render the pitch as fluid as possible but without decomposing the pitch. An upper temperature of about 175° C. is suitable, providing green densities of 1.70 to 1.95 gms./cc. A temperature much lower than this upper temperature, such as 135° C., results in lower green densities of about 1.60–1.65 gms./cc. which require additional impregnations to achieve the same desired final product density achievable where the pitch is heated to the upper temperature. The material is die pressed at a pressure of about 21,000 p.s.i. and a temperature of about 175° C. and cooled under the same pressure to produce an anisotropic graphite structure. The pressure is released, the end cap removed, and the ram pushed through the extrusion press to remove the billet.

The anisotropic graphite billet is next comminuted to destroy the orientation of the graphite particles, and the material screened. The screen size should be selected to provide a screened material which has a particle size of the order of the finest graphite particles desired in the final product. A 200-mesh screen size is quite suitable, and where a small graphite particle size is believed advantageous, a 325-mesh screen size may be used. Below a 325-mesh screen the mixture is difficult to screen.

The minus 200 material is subsequently isostatically pressed to produce an isotropic graphite structure by pressing at a pressure of at least 30,000 p.s.i. and a temperature of about 135° C. and cooled to 50° C. under the same pressure. This step may conveniently be carried out by placing the graphite particles in a Unichrome bag, and vibrating the particles until packed and hard. The bag is then sealed, degassed (overnight to less than 500 microns), and preheated to 140–150° C. in warm oil to soften the pitch. While temperatures up to about 170° C. are preferable for this pre-heat step, the Unichrome bags have a temperature limit of about 150° C.; thus, where the higher pre-heat temperature is employed, other container materials, such as stainless steel, may be utilized.

At this point in the process operation the isotropic graphite structure contains pitch and has a green density, which may vary over a wide range. The density of the isotropic graphite structure at this state of the process must be such as to be compatible with the subsequent process operations, and a density value between 1.70–1.95 gms./cc. is quite suitable. Density values above about 1.95 gms./cc. result in slow gas diffusion and render the carbonization of the structure more difficult. On the other hand, densities below about 1.70 gms./cc. necessitate additional impregnations to achieve the same final product density.

Carbonization and removal of volatile materials

After pressing, the Unichrome bag is cooled under pressure and the isotropic graphite structure removed for heating to an elevated temperature, such as 2000° C., to carbonize the pitch and remove essentially all volatile materials which remain after the carbonization of the pitch. Applicant has discovered that the density of the structure could be maintained at its green density, i.e., that value between 1.70–1.95 gms./cc., by carbonizing in a confining graphite die with not external pressure being applied. Where the isotropic graphite structure was carbonized without the graphite die the density decreased to about 1.35 gms./cc. Carbonization of the graphite structure should be carried out employing a heat cycle which will avoid crack development in the structure. A 10-day heat cycle wherein the graphite structure is carbonized to about 1000° C. without incidence of crack development is:

| Starting temp. (° C.) | Increased temp. (° C.) | Rate of increase (° C./hr.) |
|---|---|---|
| Room temperature | 200 | 2 |
| 200 | 356 | 1.3 |
| 356 | 656 | 6 |
| 656 | 1,000 | 15 |

Weight losses of about 5 percent occur during carbonization; however, shrinkage occurring simultaneously therewith compensates for the weight loss, and bulk densities before and after carbonization are essentially the same.

After carbonization at 1000° C. the isotropic graphite structure contains approximately 0.5 weight percent of volatile materials. Removal of these residual volatile materials, mainly hydrogen, may then be accomplished by heating to about 2000° C., utilizing the following heat cycle:

| Starting temp. (° C.) | Increased temp. (° C.) | Rate on increase (° C./hr.) |
|---|---|---|
| Room temperature | 1,000 | 100 |
| 1,000 | 1,500 | 50 |
| 1,500 | 2,000 | 100 |

Impregnation and carbonization of the graphite structure

At this stage of the operation the structure, which has a density of about 1.83 gms./cc. where for example the green density was 1.85 gms./cc., is all graphite and carbon with the graphite particles being bonded together by the binder carbon. The isotropic graphite structure is then subjected to a series of repetitive impregnations with pitch, followed by elevated temperature heat treatment, to reduce the pore size and increase the density. The impregnation may conveniently be accomplished by evacuating the material (<50 microns) and isostatically pressing the structure in a gas autoclave. Pressures above 4500 p.s.i. are required to insure a sufficient quantity of the pitch penetrating the pores of the structure and the pitch should be heated to an elevated temperature, such as about 200° C., in order to melt the pitch to facilitate the impregnation of the pitch. Impregnation periods from 20–60 hours have been employed without apparent differences, with impregnating times of about 48 hours being preferred.

The impregnated isotropic graphite structure is next submerged in pitch and heated to an elevated temperature to first carbonize the pitch and then remove essentially all volatile materials. Again a suitable carbonization temperature is about 1000° C. The structure is submerged in pitch during this step to prevent the loss of impregnated pitch from the structure. The 10-day heat cycle previously given for effecting the first carbonization may be employed here, except that the rate of temperature increase is doubled. Afterwards, the impregnated structure may then be heated to about 2000° C. to remove the residual volatile materials. The same heat cycle given previously for effecting the removal of residual materials may be employed for this operation.

Repetitive impregnations

As noted hereinbefore, the isotropic graphite structure may be impregnated a number of times, followed each time by carbonization and removal of essentially all volatile materials, to achieve a desired density. The reimpregnations may conveniently be carried out using the same procedures and techniques employed in the initial impregnation; namely, impregnating at 4500 p.s.i., and 200° C. for 48 hours in a gas autoclave, followed by carbonization at 1000° C. while submerged in pitch and heating to 2000° C. to remove the volatile materials. Extremely high densities (—2.0 gms./cc.) have been obtained with only three impregnations at 4500 p.s.i., 200° C. and 20–60 hours, carbonization being effected each time at 1000° C. after impregnation. In general it has been found that the higher the starting density the higher the final density, with smaller density increases being obtained with each reimpregnation.

Graphitization of the impregnated structure

After the desired density is obtained the isotropic graphite structure is heated in a final step to about 3000° C. to fully graphitize the structure. A convenient heat cycle may comprise: heating from room temperature to 2000° C. at 100° C./hr. and then to 3000° C. as allowed by the induction furnace and held at that temperature for one hour. This final heating step provides an isotropic graphite structure which is essentially 100 percent graphite. In general, the porosity follows the material density with the porosity of the fired structure ranging from 8.46 to 12.41 percent. Also, the impregnations shift the average pore size range from $0.05$–$0.06\mu$ down to $0.03$–$0.04\mu$. Room temperature gas permeability (helium) of unimpregnated graphite structures fired to 3000° C. was determined to be within the range of $2 \times 10^{-4}$–$3 \times 10^{-4}$ cm.$^2$/sec. From the average pore size data, which indicated a smaller average pore size after impregnation, the room temperature gas permeability (helium) for the impregnated graphite structures is believed to be lower than that measured for the unimpregnated graphite structure.

It is therefore to be understood that all matters contained in the above description are illustrative only with many modifications and variations being made without departing from the scope of the invention, which is to be limited only by those indicated in the appended claims.

What is claimed is:

1. A process for preparing a high density, isotropic graphite structure said structure being essentially 100 percent graphite comprising the steps of:
   (a) wet-blending an admixture of graphite flour having an average particle size no greater than —5 micron and pitch;
   (b) forming an isotropic graphite structure from said admixture, said structure having a density selected from a value within the range of 1.70–1.95 gms./cc.
   (c) heating said isotropic graphite structure in a confining graphite die to an elevated temperature to carbonize said pitch and remove essentially all volatile materials while maintaining said density at said value;
   (d) impregnating the resulting graphite structure with pitch by isostatic pressing at a pressure of at least 4500 p.s.i. and a temperature of about 200° C.;
   (e) heating said impregnated structure while submerged in pitch to an elevated temperature to carbonize the pitch and remove essentially all volatile materials;
   (f) repeating steps (d) and (e) until the resulting isotropic graphite structure has a density of at least 1.95 gms./cc.; and
   (g) heating the isotropic graphite structure to a temperature of about 3000° C. to fully graphitize said structure.

2. The method of claim 1 wherein said graphite flour comprises a mixture of graphite flour having an average particle size of —5 micron and graphite flour having an average particle size of 0.03 micron, said heating to carbonize said pitch and remove said volatile materials is conducted at 1000° C. and 2000° C., respectively, and said isotropic graphite structure is evacuated to below 50 microns prior to said impregnation step.

3. The method of claim 1 wherein said isotropic graphite structure is formed from said admixture by:
   (a) screening said admixture through a 200-mesh screen;
   (b) die pressing at 21,000 p.s.i. the minus 200-mesh material into an anisotropic graphite billet;
   (c) comminuting said graphite billet into minus 200-mesh material to destroy the orientation of the graphite particles; and
   (d) isostatically pressing said minus 200-mesh material to form said isotropic graphite structure.

4. The method of claim 3 wherein said die pressing is carried out at a temperature of about 175° C.

5. The method of claim 3 wherein said isostatic pressing is carried out at a pressure of 30,000 p.s.i. and a temperature of about 135° C.

6. The method of claim 1 wherein said isotropic structure has an initial density of 1.85 gms./cc. and a final density after 3 impregnations of 1.95 gms./cc.

7. The method of claim 1 wherein said admixture comprises 85 parts by weight —5 micron particle size graphite flour, 15 parts by weight 0.03 micron particle size graphite flour and 25 p.p.h. pitch.

8. The method of claim 7 wherein said —5 micron and 0.03 micron graphite flours have a boron content less than 1 p.p.m., iron content less than 50 p.p.m. and other impurities being trace concentrations, said graphite flours being fired to a temperature of at least 2800° C. prior to forming said admixture.

9. The method of claim 1 wherein said pitch comprises a thermoplastic organic binder having a melting point of about 140° C.

References Cited

UNITED STATES PATENTS

| 2,761,848 | 9/1956 | Bushong et al. | |
| 2,997,744 | 8/1961 | Stoddard et al. | 264—29 |
| 3,001,237 | 9/1961 | Balaguer | 264—29 X |
| 3,011,960 | 12/1961 | Williams et al. | |
| 3,197,527 | 7/1965 | Krummeich | 264—29 |
| 3,245,880 | 4/1966 | Martin et al. | 23—209.1 X |
| 3,280,231 | 10/1966 | Bentolila et al. | 264—29 |
| 3,284,372 | 11/1966 | Bailey | 264—29 X |
| 3,321,375 | 5/1967 | Martin et al. | 23—209.1 X |

EDWARD J. MEROS, Primary Examiner

U.S. Cl. X.R.

23—209.1